(12) United States Patent
Maes

(10) Patent No.: US 7,315,740 B2
(45) Date of Patent: *Jan. 1, 2008

(54) ROAMING ACROSS DIFFERENT ACCESS MECHANISMS AND NETWORK TECHNOLOGIES

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/556,028

(22) Filed: Nov. 2, 2006

(65) Prior Publication Data

US 2007/0060123 A1  Mar. 15, 2007

Related U.S. Application Data

(63) Continuation of application No. 10/856,560, filed on May 28, 2004, now Pat. No. 7,167,705.

(60) Provisional application No. 60/483,283, filed on Jun. 27, 2003.

(51) Int. Cl.
*H04Q 7/20* (2006.01)

(52) U.S. Cl. ............... 455/432.1; 455/411; 455/435.2; 370/331; 713/168; 709/229

(58) Field of Classification Search ........ 455/410–411, 455/435.1–435.2, 445, 552.1; 445/432.1–432.3; 713/153, 168–170; 370/328, 338, 331–335, 370/350, 352, 395.52; 709/203, 223–224, 709/229, 226

See application file for complete search history.

(56) References Cited

U.S. PATENT DOCUMENTS 5,850,517 A   12/1998   Verkler et al.

(Continued)

FOREIGN PATENT DOCUMENTS

FR    2834159 A    6/2003

(Continued)

OTHER PUBLICATIONS

Maes, Stephanie, Multi-modal Web IBM Position W3C/WAP Workshop, IBM Research Human Language Technologies, downloaded http://www.w3.org on May 26, 2003, 9 pages.

(Continued)

*Primary Examiner*—George Eng
*Assistant Examiner*—Kamran Afshar
(74) *Attorney, Agent, or Firm*—Townsend & Townsend & Crew LLP

(57) ABSTRACT

In one embodiment, a method of allowing a user to roam from one wireless network and interact with an Internet-based application is disclosed. The method comprises establishing a connection between a wireless mobile device and a first wireless network, wherein the connection allows the wireless mobile device to interact with an Internet-based application; tracking a state of interaction between the wireless mobile device and the Internet-based application; terminating the connection between the wireless mobile device and the first wireless network; establishing a connection between the wireless mobile device and a second wireless network; and sending, to the Internet-based application, data representing a state of interaction of the wireless mobile device with the Internet-based application prior to terminating the connection between the wireless mobile device and the first wireless network.

17 Claims, 5 Drawing Sheets

U.S. PATENT DOCUMENTS

| | | | |
|---|---|---|---|
| 6,131,025 | A | 10/2000 | Riley et al. |
| 6,157,941 | A | 12/2000 | Verkler et al. |
| 6,167,250 | A | 12/2000 | Rahman et al. |
| 6,374,305 | B1 | 4/2002 | Gupta et al. |
| 2002/0035699 | A1 | 3/2002 | Crosbie |
| 2002/0061013 | A1 | 5/2002 | Yoshida et al. |
| 2002/0080797 | A1 | 6/2002 | Kim |
| 2002/0087674 | A1 | 7/2002 | Guilford et al. |
| 2002/0095486 | A1 | 7/2002 | Bahl |
| 2002/0136226 | A1 | 9/2002 | Christoffel et al. |
| 2002/0157007 | A1 | 10/2002 | Sashihara |
| 2002/0178122 | A1 | 11/2002 | Maes |
| 2002/0184373 | A1 | 12/2002 | Maes |
| 2002/0194388 | A1 | 12/2002 | Boloker et al. |
| 2002/0198719 | A1 | 12/2002 | Gergic et al. |
| 2002/0198991 | A1 | 12/2002 | Gopalakrishnan et al. |
| 2003/0023953 | A1 | 1/2003 | Lucassen et al. |
| 2003/0046316 | A1 | 3/2003 | Gergic et al. |
| 2003/0046413 | A1 | 3/2003 | Sakakura |
| 2003/0055977 | A1 | 3/2003 | Miller |
| 2003/0083062 | A1 | 5/2003 | Bartolome et al. |
| 2004/0054717 | A1* | 3/2004 | Aubry et al. ............... 709/203 |
| 2004/0240408 | A1 | 12/2004 | Gur |
| 2004/0242250 | A1 | 12/2004 | Sasai et al. |
| 2004/0267645 | A1 | 12/2004 | Pollari |
| 2005/0003798 | A1 | 1/2005 | Jones et al. |
| 2005/0005190 | A1* | 1/2005 | Ofir et al. ..................... 714/4 |
| 2005/0037802 | A1 | 2/2005 | Nakajima et al. |
| 2005/0107086 | A1 | 5/2005 | Tell et al. |
| 2005/0159153 | A1 | 7/2005 | Mousseau et al. |
| 2006/0059265 | A1* | 3/2006 | Keronen ..................... 709/228 |
| 2006/0160543 | A1* | 7/2006 | Mashinsky ............... 455/452.2 |

FOREIGN PATENT DOCUMENTS

WO      WO 03451052      5/2003

OTHER PUBLICATIONS

Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.

Sundsted, Todd E., With Liberty and single sign-on for all, the Liberty Alliance Project seeks to solve the current online identity crisis Java World, downloaded www.javaworld.com/javaworld/jw-02-2002/jw-0215-liberty.html on May 26, 2003, 7 pages.

Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.

Liberty Architecture Overview, Liberty Alliance Project Version 1.1, Piscataway New Jersey, Jan. 15, 2003, 44 pages.

Parlay APIs 4.0, Parlay X Web Services White Paper, The Parley Group: Parlay X Working Group, Dec. 16, 2002, 12 pages.

* cited by examiner

First Connection

Roaming

ROAMING ACROSS DIFFERENT ACCESS MECHANISMS AND NETWORK TECHNOLOGIES

CROSS-REFERENCES TO RELATED APPLICATIONS

This application is a continuation of and claims priority to U.S. patent application Ser. No. 10/856,560 filed May 28, 2004 now U.S. Pat. No. 7,167,705 which in turn claims the benefit of U.S. Provisional Application No. 60/483,283 filed Jun. 27, 2003, both of which are incorporated by reference in their entirety for all purposes.

BACKGROUND OF THE INVENTION

The present invention relates generally to techniques and a system for roaming across wireless networks. More specifically, embodiments of the invention allow for switching access across different networks from different network providers and/or different technologies.

In today's wireless mobile computing world, there are a variety of different mobile technologies that coexist for different applications and different ranges. Examples of some of these different technologies are discussed below in conjunction with FIG. 1 which graphically depicts several of the various technologies.

Shown in FIG. 1 are wireless wide area network (WWAN), wireless local area network (WLAN) and wireless personal area network (WPAN) technologies. WWAN technologies typically include cellular and related technologies such as GSM, GPRS, CDPD, CDMA, TDMA, WCDMA, etc. WWAN networks are high power, long range networks that typically have an access range on the order of several kilometers on up. WLAN technologies, on the other hand, are medium power, medium range networks that have an access range on the order of tens of meters while WPAN networks are low power, short range networks that typically have an access range of about 10 meters or less. Examples of WLAN technologies include the IEEE 802.11(a), (b), (e) and (g) technologies and examples of WPAN technologies include Bluetooth, HomeRF, IrDA and IEEE 802.15 technologies.

The Internet and Internet-based applications can be accessed by different devices over each of the wireless network types shown in FIG. 1. In order to access the Internet using a specific wireless network technology a computing device with appropriate hardware (e.g., antenna) and software (e.g., protocols) is required along with appropriate credentials (e.g., a user account) that are recognized by the network service provider. Except in some very specific cases, credentials that enable access to a network require a priory subscription to a service on the network or are based on a pay-as-you-go approach (typically for a set time period) where the user receives a temporary user ID that is authorized for use on the network. For example, in order to access a WWAN, a user typically needs a plan with a cellular data provider and in order to access a WLAN network, a user may need a subscription with a WLAN provider, a temporary account with a provider (e.g., for network usage at an airport or coffee shop) or a relationship with an enterprise network.

The need for priory subscriptions and/or an existing relationship with network service providers limits the ability for individual user's of network services to roam from one network to another.

BRIEF SUMMARY OF THE INVENTION

Embodiments of the present invention allow a user of network services to roam from one network to another without necessitating a priory subscription with each of the networks. Roaming access can be achieved through a single device that is able to connect to each of the different networks or through different devices where one device is able to connect to the first network technology and a second device is able to connect to the second network technology. Embodiments of the invention allow for switching among access across different networks from different network providers. Some embodiments of the invention allow seamless roaming across different networks from different providers while maintaining session and application state.

In one embodiment the method comprises establishing a connection between a wireless mobile device and a first wireless network. The connection allows the wireless mobile device to interact with an Internet-based application. A state of interaction between the wireless mobile device and the Internet-based application is tracked. The connection between the wireless mobile device and the first wireless network is terminated. The method further includes establishing a connection between the wireless mobile device and a second wireless network and sending, to the Internet-based application, data representing a state of interaction of the wireless mobile device with the Internet-based application prior to terminating the connection between the wireless mobile device and the first wireless network.

In another embodiment, the method comprises establishing a connection to a first wireless network with a mobile device, using the mobile device to interact with an Internet-based application through the first wireless network, tracking data related to a state of interaction with the Internet-based application, establishing a connection to a second wireless network with the mobile device, and sending data related to the state of interaction with the Internet-based application to the Internet-based application.

In a third embodiment, the method comprises establishing a connection between a wireless mobile device and a first wireless network. The connection allows the first wireless mobile device to interact with an Internet-based application. The method further comprises tracking a state of interaction between the first wireless mobile device and the Internet-based application, terminating the connection between the first wireless mobile device and the first wireless network, establishing a connection between a second wireless mobile device and a second wireless network. The second mobile device is different from the first wireless mobile device. Data representing a state of interaction of the first wireless mobile device with the Internet-based application prior to terminating the connection between the first wireless mobile device and the first wireless network is sent to the Internet-based application.

In a fourth embodiment, a system for facilitating roaming from one network to another is disclosed. The system comprises an authentication component configured to authenticate wireless mobile devices for use on a plurality of wireless networks and a synchronization manager component. The synchronization management component is configured to track a state of interaction between a wireless mobile device and an Internet-based application through a first wireless network, and in response to receiving an appropriate request, establish a session between the wireless mobile device and the Internet-based application through a second wireless network and send data representing the state of interaction to the Internet-based application.

These and other embodiments of the invention along with many of its advantages and features are described in more detail in conjunction with the text below and attached figures.

DETAILED DESCRIPTION OF THE INVENTION

Figure 2:
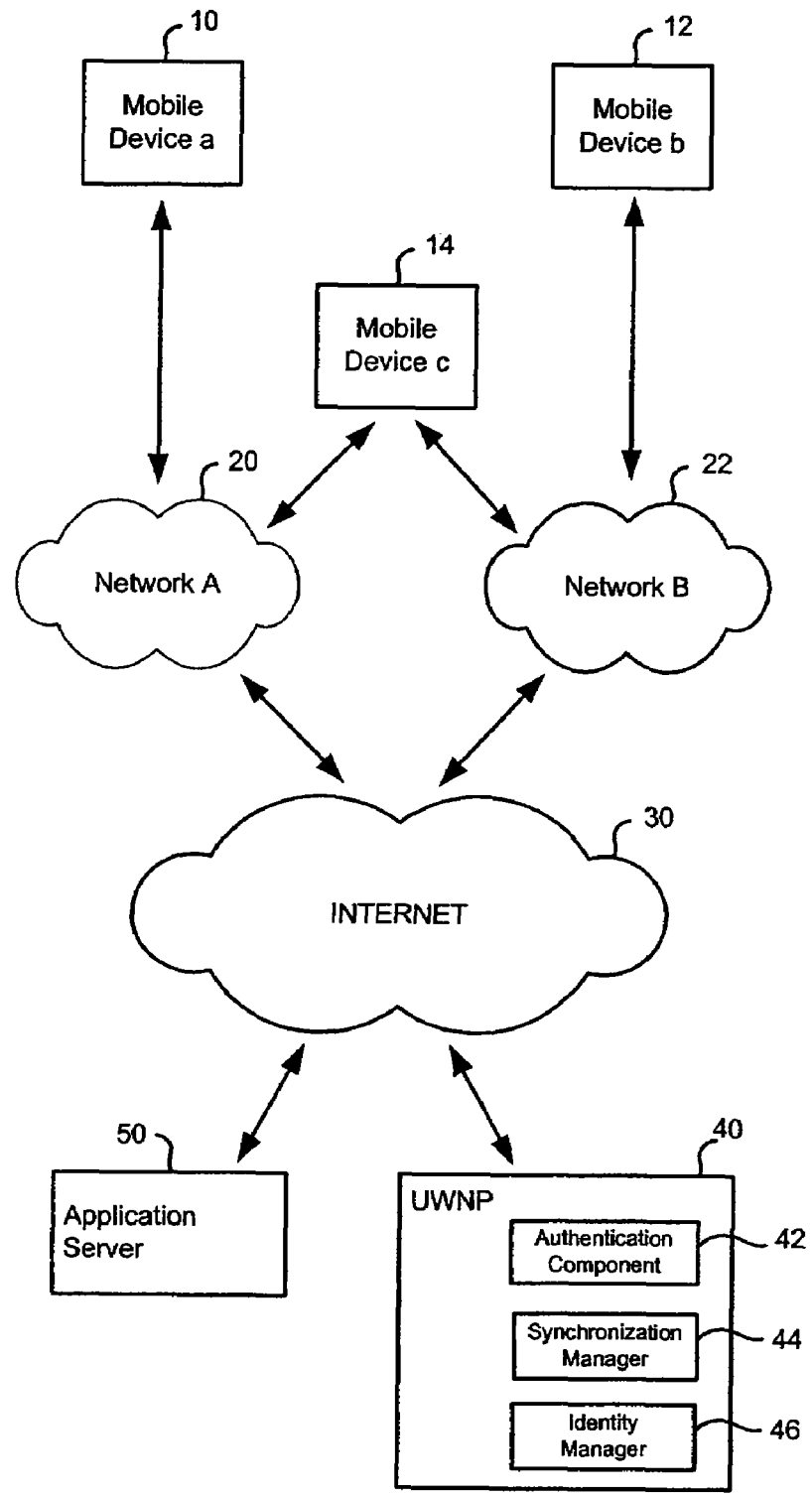
FIG. 2 is a block diagram of a system that allows mobile devices to roam across different networks according to one embodiment of the invention.

FIG. 2 is a block diagram of a system that allows mobile devices to roam across different networks according to one embodiment of the invention. Shown in FIG. 2 are mobile devices 10, 12 and 14 that access Internet 30 through one or more of networks 20, 22. Mobile devices 10, 12, and 14 may be, for example, wireless-equipped laptop computers, internet-capable cellular phones, wireless-equipped personal digital assistants (PDAs) or any other mobile computing device that is able to connect to a wireless network to access one or more Internet-based services through the network. Networks 20 and 22 may rely on differing technology and/or use different service providers to enable mobile devices to connect to the networks. In some embodiments networks 20 and 22 can be different technologies deployed by the same or different service providers, different cells using the same technology but operated by different service providers, or can be different cells using the same technology and service provider.

Figure 1:
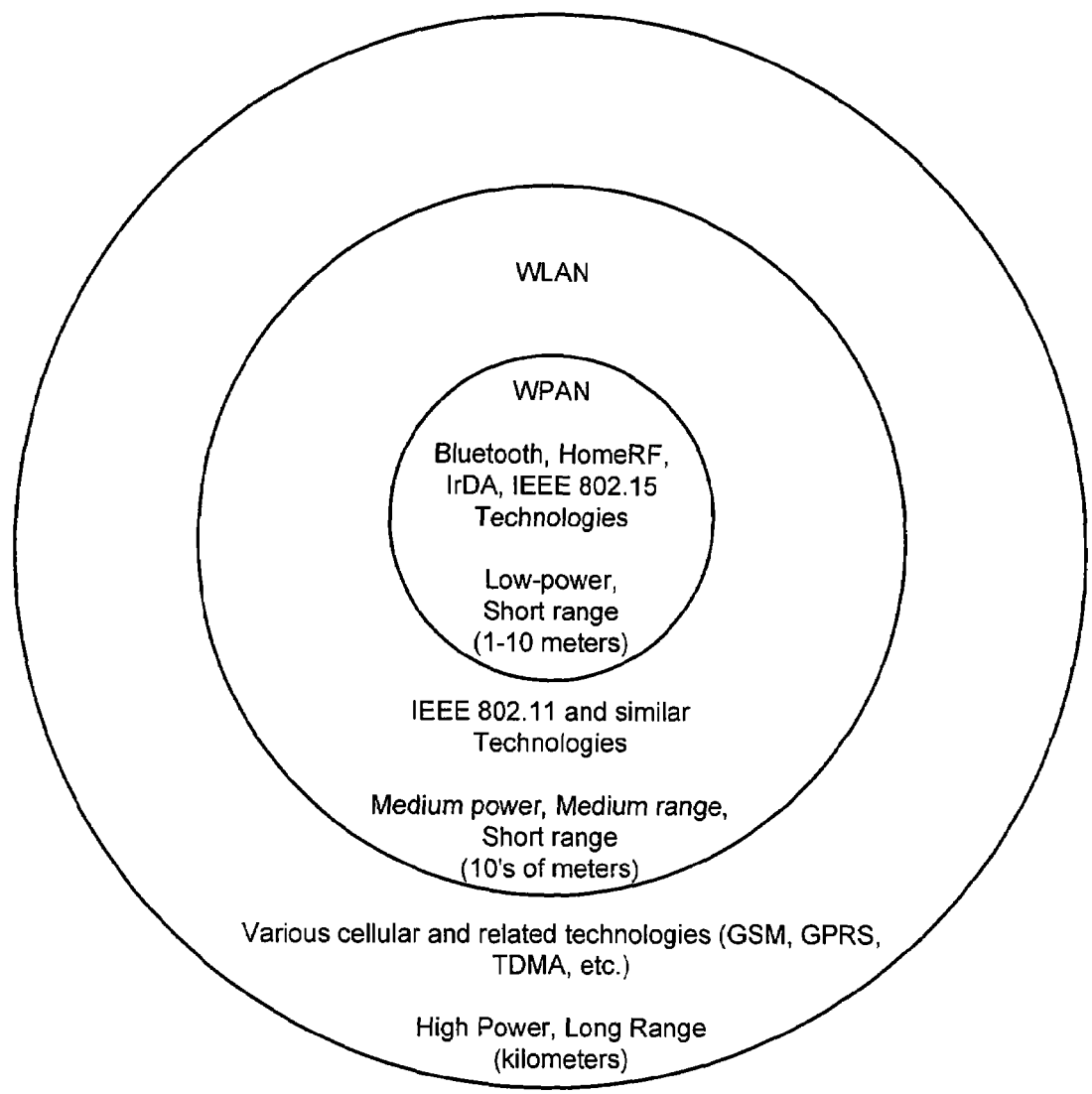
FIG. 1 graphically depicts a simplified comparison of several currently available mobile network technologies.

Networks 20 and 22 may be based on any of the technologies shown in FIG. 1 or on any other appropriate wireless network technology. As examples, in one embodiment, network 20 may be a cellular based 3G WWAN network and network 22 may be an 802.11(b) WLAN network. In another embodiment network 20 may be a 802.11(g) WLAN network operated by company X and network 22 may be a 802.11(g) WLAN network operated by company Y.

As shown in FIG. 2, mobile device 10 is equipped with hardware that enables the device to access Internet 30 through network 20; mobile device 12 is equipped with hardware that enables the device to access Internet 30 through network 22 and mobile device 14 is equipped with hardware that enables the device to access Internet 30 through either network 20 or network 22. Also shown in FIG. 2 are a computer system/server 40 for a universal wireless network provider (UWNP) and an application server 50. UWNP 40 includes an authentication component 42 that authenticates mobile devices, such as mobile devices 10, 12 and 14 across multiple networks such as networks 20 and 22 and a synchronization manager 44 that tracks the state of interaction between a wireless mobile device and various Internet-based applications the device is being used to interact with.

Application server 50 hosts one or more applications that are accessed over the web by computing devices such as personal computers and mobile devices 10, 12 and 14. Application server 50 may include multiple servers in a distributed computing system. In some embodiments, server 50 may implement one or more virtual private networks. A person of skill in the art will appreciate that there are thousands of different application servers in addition to application server 50 that can be accessed over the Internet providing thousands of different services and/or applications for use by computing devices such as mobile devices 10, 12 and 14.

Embodiments of the invention allow mobile devices to roam across multiple networks, for example from network 20 to network 22, such that a connection to an Internet-based application, such as an application supported by application server 50, that is initially established through a first network can be switched so that the connection is established through a second network. In some embodiments, the switch of the connection may be implemented to minimize the impact to the user of the network switch. In some cases, the user may not even notice that a connection change occurred. The connection may be switched during a single session in which the mobile device is continuously connected to Internet 30, may be switched from a first session to a subsequent, second session where the mobile device is disconnected from Internet 30 for a time period and then reconnected in the second session at the same application state at which the device was disconnected from Internet 30 during the first session or may be switched from a first session to a subsequent, second session where different mobile devices are used to connect to Internet 30 during each session.

In some embodiments, users (e.g., owners of the mobile devices) may be required to register with UWNP 40 or otherwise be registered with UWNP 40 through other mechanisms. In some instances, the registration may be done on behalf of the user (e.g., the service provider may register the mobile device with the UWPN). Authentication component 42 of UWNP 40 authenticates the mobile device for usage on the networks. By way of example, in one embodiment, the mobile device may be authenticated by comparing a device ID to a database of device IDs that are registered with the UWNP 40.

UWNP 40 also includes a synchronization manager 44 that provides session management services that enable roaming to be smoothly transitioned from one network to a second network for applications that are written to allow for such. The synchronization manager is a software program/engine that maintains the state of all active applications to support various roaming modes allowed by embodiments of the invention. In some embodiments the synchronization manager may be a program that executes on the mobile device (not shown in FIG. 2) rather than on the server-side. Also, in some embodiments the synchronization manager (or another software component executing on a UWNP server) provides identity management features that enable a user to project a single identity for himself to a service provider or application even when the user is accessing the network using different user names (e.g., a personal identity or a work identity) or different mobile devices (e.g., a wireless laptop computer or a cell phone).

The state of the interaction may be preserved by capturing a user's interaction events with a data model. For instance, the data model may represent the structure of a web form (e.g., an XForms data model) and the user interaction events may represent the user's interaction with the form. The interaction events may be captured and interpreted as to how the interactions affect the data model associated with the interaction. For instance, each character entered in a data field of a form affects the data model. At periodic intervals, the information may be stored and sent or otherwise synchronized with the synchronization manager. In one embodiment, the impact of a user's interactions may be stored as an XForms data model and periodically synchronized with a repository associated to the user session in the synchronization manager. Both interaction events and data model may be captured, stored, and synchronized with different granularities. By way of example, interactions may be captured each time an event occurs (event based), when a field is filled and an off focus event is received (field based), after several fields are filled (block based), at a form or page event, such as when a form is completed, or at other appropriate points in a user's interaction with a data model.

Some embodiments of the invention allow for three different modes of roaming: (1) suspend and resume mode; (2) connect/intermittently disconnected/disconnect mode and (3) multi-device roaming. Internet-based applications can be written to support one or more of the above roaming modes. Other modes and programming models that support a seamless switch between devices and/or networks can be implemented in other embodiments of the invention. Suspend and resume mode and connect intermittently disconnected/disconnect mode can be supported by a synchronization manager that executes on either the device side or server side of the system. Multi-device roaming, however, may require that the synchronization manager execute on the server-side of the system or somewhere in the network accessible from the different networks/devices that are used. Alternately, the state of the interaction that is saved on the first device may be transmitted to the second device.

Applications that support suspend and resume mode allow the application to be interrupted and subsequently resumed at the interrupted state at a later time using a different network (e.g., through an access network based on a different technology) or a different mobile device. In some embodiments, applications can be written to support a granular suspend and resume mode where they can be interrupted at any time but resumed only at specific points in the program. As one example of suspend and resume mode, if a user is completing an electronic form that requires the user to enter his first and last name, home address, home phone number and email address along with other information on a web site, the synchronization manager saves the data model requested by the web site (i.e., the form) and tracks information the user enters into the form with mobile device 60. If the user's session is interrupted prior to completing the form, for example the user enters his first and last name and his address but not his home phone number, email address or other information, synchronization manager may maintain sufficient information so that when the user's connection with the website is reestablished, the form can be pulled back on an active screen with the user's name and address information reentered into the form by the synchronization manager so the user only has to complete the remaining phone number, email address and other fields of the form. In some embodiments, the user may be given the option whether to resume the form completion before the form is displayed on an active screen.

Applications that support connect/disconnect mode allow seamless roaming to be used when part of the application executes on the mobile device and part of the application executes on an application server 50 accessed through the Internet. Examples of such applications include applications that run on an embedded web server and have client-side logic that can emulate part of the application business logic on the client when the network is absent. Typically, the client business logic interacts with a local, client-side data store or repository. When the network is on, the data store after being updated by the business logic is synchronized with the backend data. Updates on the backend can be synchronized with the client using push technology, for example, upon an event or change, periodically by the client, or upon initiation from the client. Such applications often have additional mechanisms to deal with conflicts. Examples of such applications include Oracle's Web-to-Go, which is collection of components and services that facilitates development, deployment, and management of mobile Web applications, and the Blackberry™ email service.

In an application that supports multi-device roaming, the user can switch from a first mobile device 10 that accesses the application through a first network, such as network 20, to a second mobile device 12 that accessed the application through a second network, such as network 22 while interacting with the application. The switch from mobile device 10 to mobile device 12 may include, for example, switching from a WAP phone that accesses an application through a WAP browser to a wireless PDA or kiosk that accesses the application through an XHTML (extended HTML) browser. As another example, a user may switch from a device that interacts with an application through a graphical user interface agent to a device that interacts with the application through a voice user agent. Multi-device roaming for other deployments of applications that use multi-modal interactions may also be supported by synchronization manger 44.

Similar to suspend and resume mode, applications that support multi-device roaming can be written with different levels of granularity. Implementing multi-device roaming, however, requires that synchronization manager 45 be deployed on the server side (e.g., at UWNP 40) as opposed to solely on the mobile device itself.

Once a user is registered with a UWNP, a user may log onto a network associated with the UWNP to establish a first connection and establish the terms of the usage (e.g., the cost structure of the connection). The user may then wander into the range of a second network that is also associated with the UWNP and roam from the first network to the second network. Alternatively, the user may disconnect from the first network and subsequently connect to the second network. As used herein, a network is associated with the UWNP if there is some mechanism and/or agreement between the UWNP and an owner of the network for billing a user for use of the network through the UWNP.

Figure 3A:
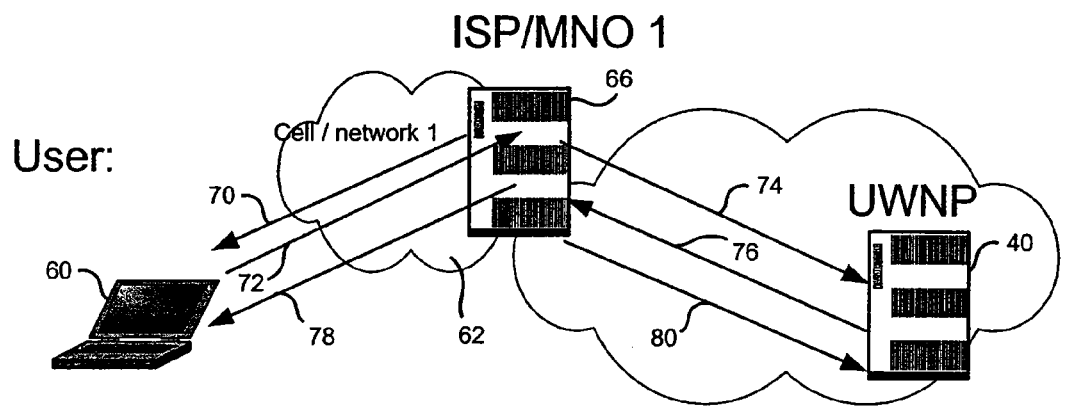
FIG. 3A schematically illustrates a sequence of events associated with a user logging onto a first network according to one embodiment of the invention.
Figure 3B:
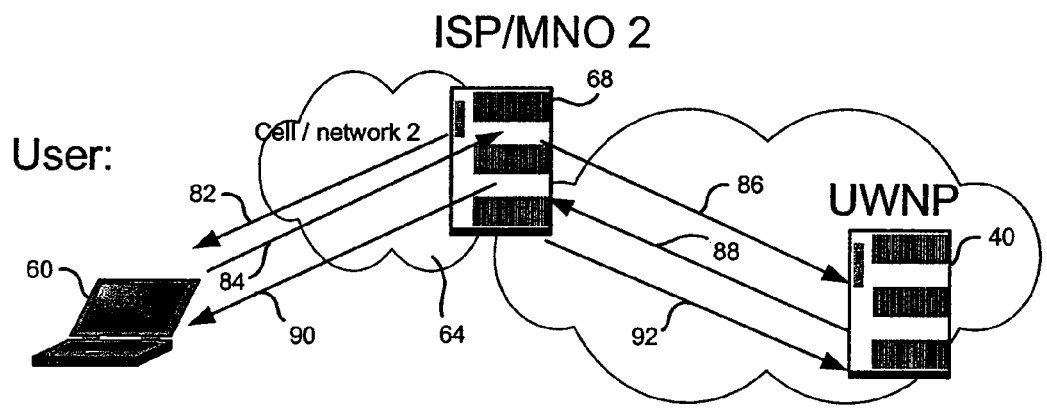
FIG. 3B schematically illustrates a sequence of events occurring when the user in FIG. 3A roams from the first network to a second network according to one embodiment of the invention.
Figure 4:
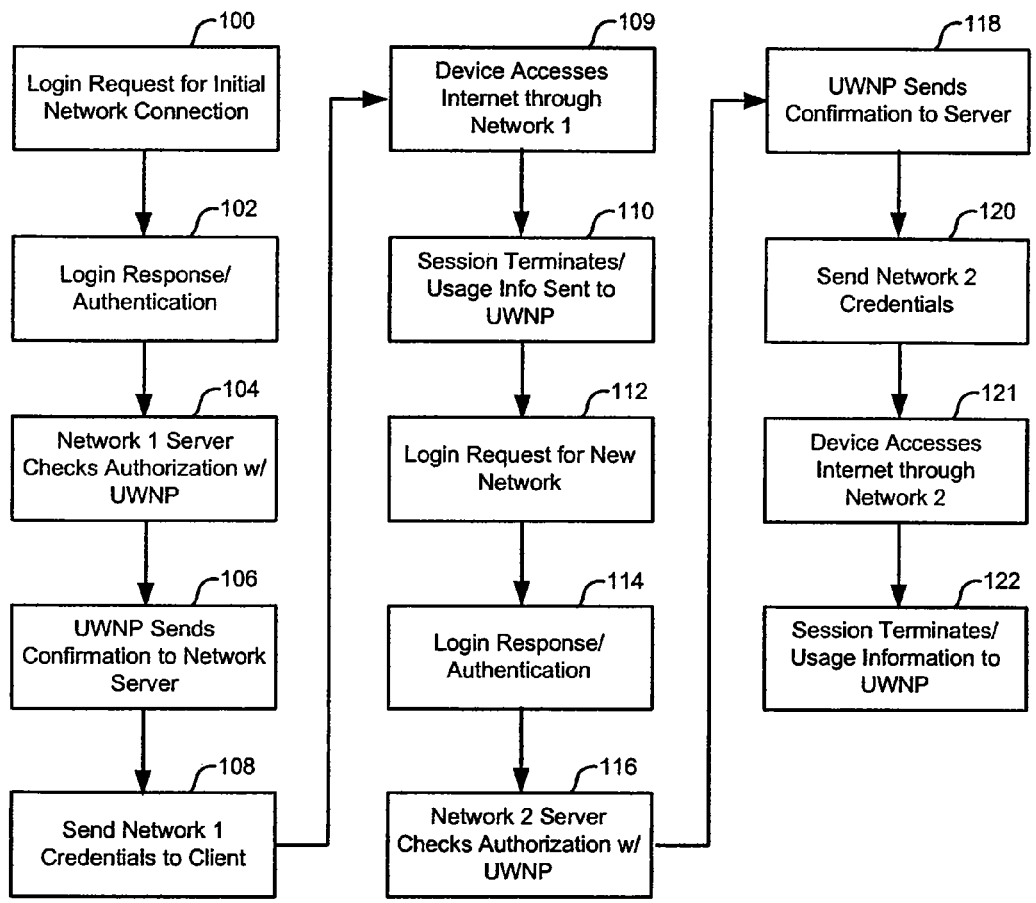
FIG. 4 is a flow chart illustrating steps associated with the events depicted in FIGS. 3A and 3B.

One specific embodiment of the invention is described below in conjunction with FIGS. 3A, 3B and 4, where FIGS. 3A and 3B schematically illustrate a sequence of events associated with a user logging onto a first network and roaming from the first network to a second network and FIG. 4 is a flow chart illustrating steps associated with the roaming process. For purposes of illustration only, the embodiment discussed with respect to FIGS. 3A, 3B and 4 can be envisioned to allow an individual on a business trip with a laptop computer (mobile device 60) that includes an 802.11(b) wireless network card to access the Internet from multiple locations using different networks within an airport. For example, the user may access the Internet from a first 802.11(b) network 62 in a frequent flyer lounge area and then roam to a second 802.11(b) network 64 located in an airport coffee shop prior to leaving the airport.

Referring to FIGS. 3A and 3B, networks 62 and 64 each have servers 66, 68 that handle login requests to the networks and interface computers on the networks to the Internet. Upon entering the range of network 62, mobile device 60 receives a request 70 from server 66 to login to network 62 (FIG. 4, step 100). Request 70 may be generated by the internet service provider (ISP) or mobile network operator (MNO) that runs network 62 from its server 66. In response to request 70, mobile device 60 may initiate an automatic or manual login process to network 62 (FIG. 4, step 102). Either process may include, for example, passing user identification information via a response 72 that enables UWNP 40 to authenticate device 60 for a connection to network 62.

In response to receiving identification information from device 60, server 66 sends a request 74 to UWNP 40 to check for billing authorization to establish that device 60 has an account with UWNP 40 and can thus be billed for usage of network 62 through UWNP 40 (FIG. 4, step 104). UWNP 40 authenticates device 60 and sends a response 76 back to server 66 indicting that device 60 is an approved client (FIG. 4, step 106) and server 66 then forwards appropriate credentials to device 60 via a response 78 (FIG. 4, step 108). Logging into network 62 implies that the user will be billed and pay for usage of the network. Billing/payment can be done with a credit card or any other billing approach accepted for mobile communications.

Once authorization is obtained to use network 62, device 60 can remain connected to the network and access content from outside of the network (e.g., content over the Internet) for the duration of a session as long as the device is within the wireless range of network 62 (FIG. 4, step 109).

At the end of a session on network 62, server 66 can pass usage information (e.g., the time that device 60 was connected to network 62) to UWNP 40 (FIG. 4, step 110) in order to facilitate subsequent billing for the connection or to allocate money already paid by the user of device 60 to the UWNP to the ISP/MNO associated with network 62.

While mobile device 60 is accessing an application over the Internet (step 109), such as an application hosted by server 50 shown in FIG. 2, through network 62, the synchronization manager (not shown in FIG. 3A or 3B) tracks the state of any and all applications run by the mobile device. In some embodiments, the state of interaction in an Internet-based application is only tracked if the application is registered with the UWNP to allow for such tracking. The information tracked by synchronization manager 44 can be subsequently used to re-establish a session with an appropriate Internet-based application on a new network or with a new device as described below. Depending on the granularity of data tracking supported by the Internet-based application, the session can be reestablished at exactly the same point where the connection was terminated (i.e., the invention allows for seamless roaming) or can be established at some other previously achieved point of interaction.

In some embodiments the synchronization manager or a separate identity management software component 46 also tracks the state of a user's interaction with an application when employing different identities on different networks. For example, a user may have an identity (user ID) such as John123 on network 62 that is not available on network 64 because either network 64 requires a different format for user identities or that particular identity was already used by another user on network 64. In such a case when the user roams from network 62 to network 64, an application that expects the user to have a particular identity may reject a new identity assigned by network 64. Identity manager component 46 of UWNP 40, however, communicates to the application via a cookie added to the message (that provides the appropriate identity) or other accepted approach (e.g., exchange between service or application that provides claims or credentials or that maps the identity of an identity known by the service) a single identity. In one embodiment this is done by storing a table for each registered user that tracks various identities of the user as known to different networks the user may access the Internet with, as known to different devices the user may access the Internet from and as known to different web sites the user has established identities with. In other embodiments federation solutions like Liberty Alliance (see http://www.projectliberty.org) or WS-Federation (a specification by IBM® and Microsoft® for sharing user and machine identities among disparate authentication and authorization systems) can be used to address these issues.

When device 60 enters the range of network 64 owned or operated by a different ISP/MNO than network 62, server 68 sends a request 82 to device 60 that the device login to network 64 (FIG. 4, step 112). In response to request 82, mobile device 60 may initiate an automatic or manual login process to network 64 that includes a response 84 (FIG. 4, step 114) similar to the process described above in conjunction with step 102. Accordingly, response 84 may include user identification information that enables UWNP 40 to authenticate device 60 for a connection to network 64. In some embodiments the user will have already established rights to roam to other networks associated with the UWNP in which case authorization can be automatically provided without requesting payment information from the user. In other embodiments the user will need to accept a new payment plan/deal to use the new network.

In response to receiving identification information from device 60, server 68 sends a request 86 to UWNP 40 to check for billing authorization to establish that device 60 is authorized for use on network 64 or that the device can be appropriately billed for its usage of the network (FIG. 4, step 116). UWNP 40 sends a response 88 back to server 68 indicting that device 60 is an approved client (FIG. 4, step 118) and server 68 then forwards appropriate credentials to device 60 via a response 90 (FIG. 4, step 120) that enables device 60 to remain connected to network 64 and access content from outside of the network, for example, content over the Internet. Device 60 can than access applications and/or information over the Internet through network 64 while the device remains within the service range of the network (FIG. 4, step 121).

The synchronization manager allows the mobile device to continue any established interaction with an Internet-based application from step 109 in a manner such that the user may not notice a switch from the first network to the second network. In some embodiments upon logging onto the second network, UWNP allows the user to be presented with a list of applications that were being tracked from previous sessions. The user can then select which, if any, applications he would like to resume as if the interaction was a single continuous session. If the user selects to resume one or more of the possible applications, the synchronization manager passes sufficient information to the application so that the user resumes the application at the state at which he had previously left the application. During step 121, the synchronization manager is also tracking any new applications or updates to the state of existing applications so that such states can be resumed in any subsequently started session as described above in conjunction with step 109.

At the end of a session on network 64, server 68 passes usage information to UWNP 40 on the device's use of network 64 (FIG. 4, step 122) in order to facilitate subsequent billing for the connection to network 64 or to allocate money already paid by the user of device 60 to the UWNP to the ISP/MNO associated with network 64.

In some embodiments all exchanges between the UWNP and servers 66, 68 as well as all authentication/authorization exchanges between device 60 and servers 66, 68 are provided by secure web services such as SSL (secure sockets layer) communications. Also, in some embodiments, steps 102-108 and steps 114-120 may include one or more dialog boxes that allow the user to select from one or more different pricing schemes or packages. Similarly, there may be multiple ways to logon to an individual network such as network 62 or network 64. In such cases, a user may select in step 102 to logon to the network through UWNP 40 in which case a link to the appropriate login page of the UWNP is provided to the user in step 102.

A person of skill in the art will also appreciate that while in the example described above, as session on network 62 for device 60 terminated before device 60 was logged into network 64 it is possible for the session on network 62 to terminate after, or in response to, a connection being established with network 64. Similarly, if device 60 is within range of both networks 62 and 64, the user of the device may select which of the two networks to run applications through based on any of a number of possible criteria, such as, usage cost, a preference for one network over another, strength of signal, etc. In other embodiments, the session on network 62 may be terminated independent of the possibility of establishing a connection with network 64 or any other network.

Some embodiments of the invention allow for multiple UWNP service providers. In such cases the user may select different UWNPs to access different network providers and different UWNPs can be trusted by different ISPs/MNOs. In one specific embodiment a federation of UWNPs can exist that follows predefined protocols for establishing network identify information without compromising privacy and security of the information. An example of such identity protocols is described in U.S. Patent Application No. {{21756-8 case/OID 2003-005-01}}, which is hereby incorporated by reference.

Figure 5:
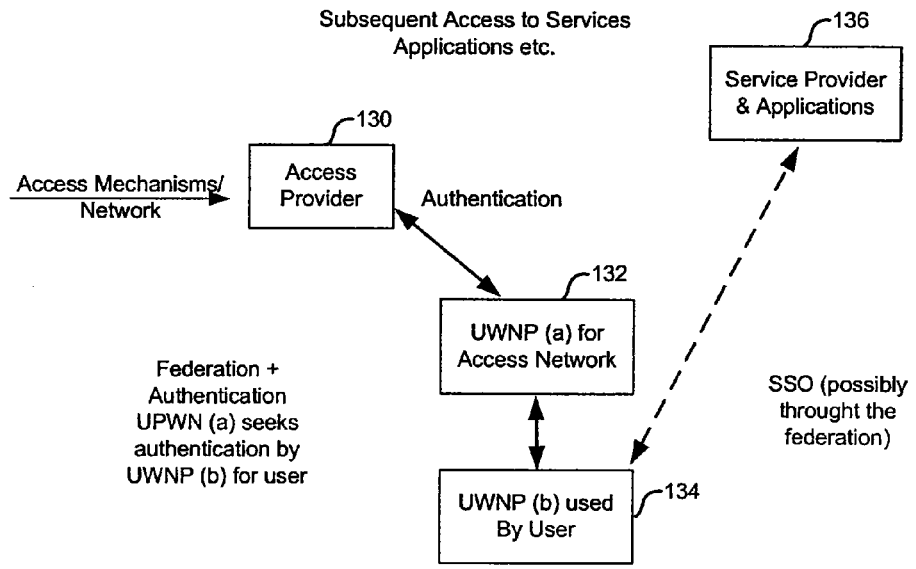
FIG. 5 is a block diagram that illustrates an authentication process involving multiple UWNPs in a federation according to one embodiment of the present invention.

In some embodiments, if the user who is registered with a first UWNP (UWNP B) seeks to login to a network where the MNO is only associated with a second UWNP (UWNP A) that is different from the first UWNP, but both the first and second UWNPs are in a federation, the authentication process requires an additional step where UWNP A seeks authentication of the user by the federation by passing a message to UWNP B. FIG. 5 illustrates one such embodiment.

Shown in FIG. 5, which is a block diagram that illustrates one embodiment of an authentication process involving multiple UWNPs, is a wireless network 130 controlled by an access provider, such as an MNO. When a user attempts to access network 130, a server on the network (not shown) sends a request for authentication to a server 132 associated with UWNP A. The server at UWNP A recognizes that the user is registered with UWNP B and is not registered with UWNP A and seeks authentication of the user from a server 134 associated with UWNP B. The results of the authentication process are ultimately passed back to the user through server 132 and 130. Once authentication is obtained, the user is then allowed to access a desired service or application hosted by a server 136 via the Internet.

Figure 6:
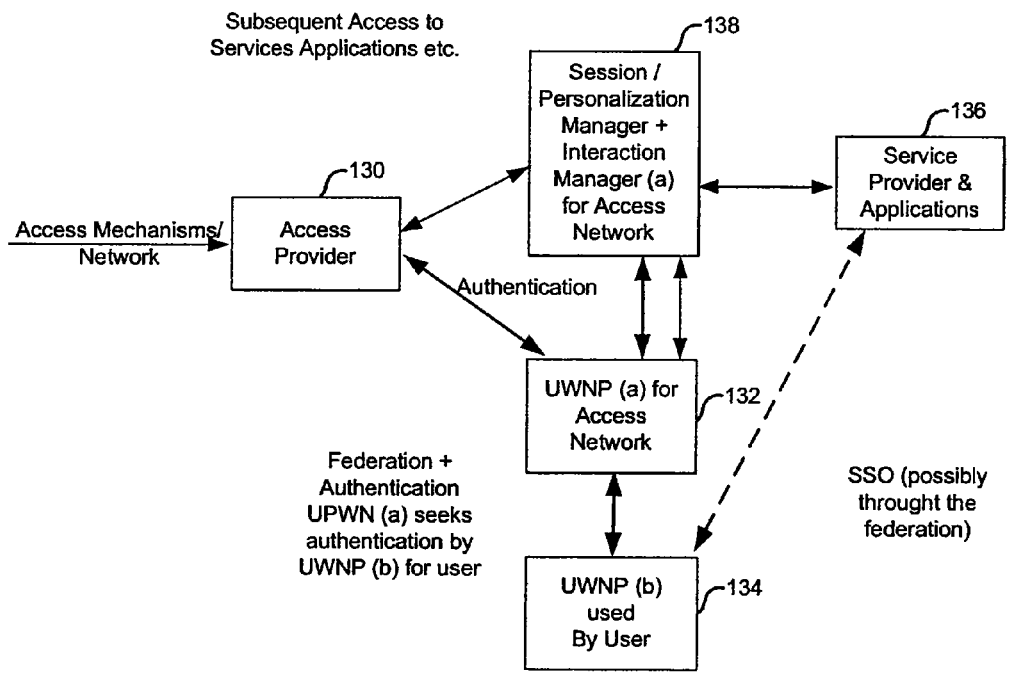
FIG. 6 is a block diagram that illustrates an authentication process according to another embodiment of the present invention.

In an embodiment where roaming will result in the user's interaction with an application being maintained at a particular state prior to the roaming, the synchronization manager interacts with the wireless mobile device and server hosting the application. As shown in FIG. 6, a synchronization manager 138 passes information related to the suspended state of the application to application server 136. By way of example, the information passed may includes user ID information associated with the session and, after the federation authorizes to pass the session, information associated to the user ID.

In further embodiments, the knowledge by the UWNP of a user's IP address and location (or other address information) can provide the capability to push notifications to the user from certain applications and/or improve universal messaging types of services. In one particular embodiment, the user may enter preferences with the UWNP as to the terms (e.g., where, when and how) such messages should be routed.

Having fully described several embodiments of the present invention, other equivalent or alternative methods of practicing the present invention will be apparent to those skilled in the art. For example, while certain embodiments discussed above illustrated use of the invention to allow for roaming across two different networks, the invention is able to allow roaming across three or even many more networks. Also, while the present invention has been described using a particular combination of hardware and software, it should be recognized that other combinations of hardware and software are also within the scope of the invention. These and other embodiments as well as alternatives and equivalents to the invention will be recognizable to those of skill in the art after reading the description of the present invention. The scope of the invention should not, therefore, be determined solely by reference to the above description, but instead should be determined with reference to the appended claims along with their full scope of equivalents and alternatives.

What is claimed is:

1. A method of allowing a user to roam from one network to another, the method comprising:
    establishing a first connection between a mobile device and a first network, the first connection allowing the mobile device to interact with an Internet-based application;
    tracking a state of interaction between the mobile device and the Internet-based application;
    terminating the connection between the mobile device and the first network;
    establishing a second connection between the mobile device and a second network; and
    sending, to the Internet-based application, data representing a state of interaction of the mobile device with the Internet-based application prior to terminating the connection between the mobile device and the first network.

2. The method set forth in claim 1 further comprising resuming interaction between the mobile device and the Internet-based application at a state determined by the data sent to the Internet-based application.

3. The method set forth in claim 1 wherein the step of establishing a second connection to a second network comprises:

sending identity information from the mobile device to a server on the second network;

sending a request to authenticate the mobile device from the second network server to a server associated with a third party;

authenticating the mobile device with the third party server; and sending confirmation of such authentication to the second network server.

4. The method set forth in claim 1 wherein the step of establishing a second connection to a second network comprises:

sending identity information from the mobile device to a server on the second network;

sending a request to authenticate the mobile device from the second network server to a server associated with a third party;

determining that authentication of the mobile device must be provided by a fourth party;

sending a request to authenticate the mobile device form the third party server to a server associated with the fourth party; and sending confirmation of such authentication to the second network server.

5. The method set forth in claim 1 wherein the mobile device that interacts with the Internet-based application through the first network is a different mobile device than that used to interact with the Internet-based application through the second network.

6. The method set forth in claim 1 wherein the step of establishing a connection to the first network comprises:

sending a request to authenticate the mobile device from the first network server to a server associated with a third party;

authenticating the mobile device with the third party server; and sending confirmation of such authentication to the first network server.

7. The method set forth in claim 1 wherein data related to a state of interaction with the Internet-based application is tracked by a synchronization manager component executing on the mobile device.

8. The method set forth in claim 1 further comprising tracking a state of interaction between the mobile device and the Internet-based application while the mobile device interacts with the Internet-based application through the second network.

9. A method of allowing a user to roam from one network to another, the method comprising:

establishing a connection to a first network with a mobile device;

using the mobile device to interact with an Internet-based application through the first network;

tracking data related to a state of interaction with the Internet-based application;

establishing a connection to a second network with the mobile device; and sending data related to the state of interaction with the Internet-based application to the Internet-based application.

10. The method set forth in claim 9 wherein the step of establishing a connection to a first network comprises:

sending identity information from the mobile device to a server on the first network;

sending a request to authenticate the mobile device from the first network server to a server associated with a third party;

authenticating the mobile device with the third party server; and sending confirmation of such authentication to the first network server.

11. The method set forth in claim 10 wherein the step of establishing a connection to a second network comprises:

sending identity information from the mobile device to a server on the second network;

sending a request to authenticate the mobile device from the second network server to the server associated with a third party;

authenticating the mobile device with the third party server; and sending confirmation of such authentication to the second network server.

12. A method of allowing a user to roam from one network to another, the method comprising:

establishing a connection between a first mobile device and a first network, wherein the connection allows the first mobile device to interact with an Internet-based application;

tracking a state of interaction between the first mobile device and the Internet-based application;

terminating the connection between the first mobile device and the first network;

establishing a connection between a second mobile device, different from the first mobile device, and a second network; and sending, to the Internet-based application, data representing a state of interaction of the first mobile device with the Internet-based application prior to terminating the connection between the first mobile device and the first network.

13. The method set forth in claim 12 further comprising using the second mobile device to resume interaction with the Internet-based application at a state determined by the data sent to the Internet-based application.

14. The method set forth in claim 13 wherein the first network is the same as the second network.

15. A system for facilitating roaming from one network to another, the system comprising:

an authentication component configured to authenticate mobile devices for use on a plurality of networks; and a synchronization manager component configured to track a state of interaction between a mobile device and an Internet-based application through a first network, and in response to receiving an appropriate request, establish a session between the mobile device and the Internet-based application through a second network and send data representing the state of interaction to the Internet-based application.

16. The system of claim 15 wherein the authentication component is configured to, in response to receiving a request to authenticate the mobile device for use on a network, receive information identifying the mobile device, authenticate the mobile device for use on the network and send confirmation of such authentication to enable the mobile device to be connected to the network.

17. The system of claim 15, further comprising a repository, and wherein the synchronization manager is configured to track the state of the interaction by periodically storing a data model, representing the state of the interaction between the mobile device and the Internet-based application, in the repository.

* * * * *

UNITED STATES PATENT AND TRADEMARK OFFICE
CERTIFICATE OF CORRECTION

PATENT NO. : 7,315,740 B2  Page 1 of 1
APPLICATION NO. : 11/556028
DATED : January 1, 2008
INVENTOR(S) : Maes It is certified that error appears in the above-identified patent and that said Letters Patent is hereby corrected as shown below:

On sheet 5 of 5, in Fig. 5, "Below box 130", line 3, delete "UPWN" and insert -- UWNP --, therefor.

On sheet 5 of 5, in Fig. 5, "Below box 136", line 2, delete "throught" and insert -- through --, therefor.

On sheet 5 of 5, in Fig. 6, "Below box 130", line 3, delete "UPWN" and insert -- UWNP --, therefor.

On sheet 5 of 5, in Fig. 6, "Below box 136", line 2, delete "throught" and insert -- through --, therefor.

In column 3, line 66, after "FIG. 2" delete "are a" and insert -- is a --, therefor.

Signed and Sealed this

Second Day of September, 2008

JON W. DUDAS
*Director of the United States Patent and Trademark Office*